F. SPINNING.
Oil-Can Faucets.
No. 151,803.          Patented June 9, 1874.
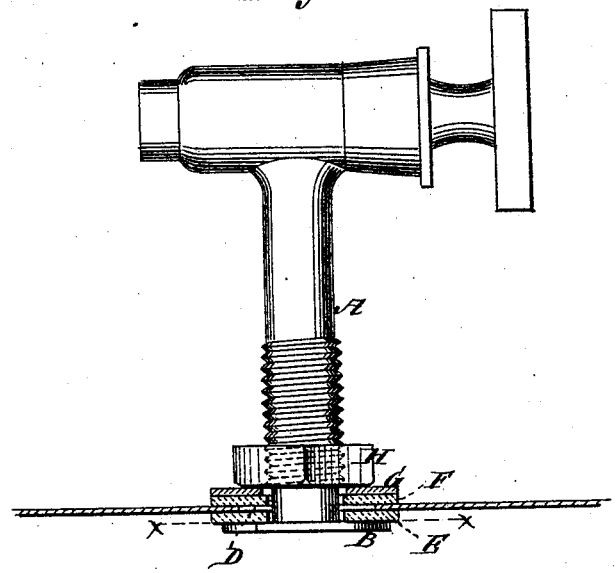
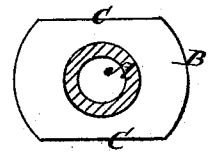
WITNESSES:
INVENTOR:
ATTORNEYS.

UNITED STATES PATENT OFFICE.

FRANK SPINNING, OF STEILACOOM, WASHINGTON TERRITORY.

IMPROVEMENT IN OIL-CAN FAUCETS.

Specification forming part of Letters Patent No. 151,803, dated June 9, 1874; application filed March 28, 1874.

*To all whom it may concern:*

Be it known that I, FRANK SPINNING, of Steilacoom, in the county of Pierce and Territory of Washington, have invented a new and Improved Oil-Can Faucet, of which the following is a specification:

My invention consists of a detachable faucet for oil-cans, to be used for drawing oil from the commercial cans now commonly used for packing the oil for market. The object is to enable the faucet to be shifted readily from an empty can to a full one and save a special faucet for each can.

Figure 1 is partly a side elevation and partly a sectional elevation of my improved detachable faucet and a part of the can, and Fig. 2 is a section on the line $x$ $x$, Fig. 1.

Similar letters of reference indicate corresponding parts.

The tube A has a flange, B, on the end to be attached to the can, which is reduced at the two opposite points C, so as to be introduced into the can through a hole, D, smaller than the greatest diameter of said washer. Next to said washer it has a movable rubber gasket, E, of same size or a little larger than it, to be forced through hole D after washer B; and next to this is another rubber gasket, F, for the outside of the can with a metal washer, G, outside of it; and outside of that a binding-nut, H, which binds the washer against the tin wall of the can on both sides and holds the faucet firmly in place when applied, and by unscrewing it the faucet is as readily released to be taken off. The gasket E may be pulled through the hole readily by a hook. The flange B is readily put in and taken out by presenting one edge a little ahead of the other obliquely to the wall of the can. The hole for attaching the faucet is cut out of the wall of the can by any suitable instrument for cutting a round hole. I prefer to have for this purpose a pivot point and a cutter, such as are commonly used for such purposes formed on the end of a wrench applied for turning the nut H, but it is not essential.

Having thus described my invention, I claim as new and desire to secure by Letters Patent—

The combination of flange B, rubber gaskets E F, metal washer G, and binding-nut H with the faucet-tube A, the flange B being clipped at C, and all arranged substantially as specified.

FRANK SPINNING.

Witnesses:
 JNO. EICHAR,
 P. KEACH.